US 6,654,008 B2

(12) United States Patent
Ikeda et al.

(10) Patent No.: US 6,654,008 B2
(45) Date of Patent: Nov. 25, 2003

(54) ELECTRONIC WHITEBOARD AND PENHOLDER USED FOR THE SAME

(75) Inventors: Masaki Ikeda, Kumamoto (JP); Kazuhiro Eguchi, Fukuoka (JP); Motoharu Kouda, Fukuoka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 82 days.

(21) Appl. No.: 09/995,102

(22) Filed: Nov. 27, 2001

(65) Prior Publication Data

US 2002/0080125 A1 Jun. 27, 2002

(30) Foreign Application Priority Data

Nov. 27, 2000 (JP) .................................... 2000-358999

(51) Int. Cl.⁷ ................................................ G09G 5/00
(52) U.S. Cl. .................. 345/179; 345/173; 178/19.01
(58) Field of Search .......................... 345/173, 174, 345/175, 176, 177, 178, 179, 180, 182, 183; 178/18.01, 18.03, 18.04, 18.09, 18.1, 19.01, 19.05, 19.07

(56) References Cited

U.S. PATENT DOCUMENTS

| 4,564,078 | A | * | 1/1986 | Enokido et al. | ......... 178/19.01 |
|---|---|---|---|---|---|
| 4,814,552 | A | * | 3/1989 | Stefik et al. | ............. 178/19.02 |
| 5,023,408 | A | * | 6/1991 | Murakami et al. | ....... 178/18.07 |
| 5,717,168 | A | * | 2/1998 | DeBuisser et al. | ....... 178/18.04 |
| 6,335,723 | B1 | * | 1/2002 | Wood et al. | ................. 345/173 |
| 6,414,673 | B1 | * | 7/2002 | Wood et al. | ................. 345/173 |
| 6,498,602 | B1 | * | 12/2002 | Ogawa | ........................ 345/173 |

FOREIGN PATENT DOCUMENTS

JP          59000266          1/1984

* cited by examiner

Primary Examiner—Xiao Wu
(74) Attorney, Agent, or Firm—RatnerPrestia

(57) ABSTRACT

An electronic whiteboard capable of being drawn by using marker pens of several colors and one penholder, and a penholder for use in such an electronic whiteboard are disclosed. In a penholder for mounting marker pens, an infrared light emitting unit emits infrared light containing color information of the marker pen, an ultrasonic wave emitting unit emits a the ultrasonic wave, and color information changeover means changes over color information depending on the color of marker pen. The electronic whiteboard main body receives the infrared light and ultrasonic wave emitted from the penholder, and issues information about a position of the penholder depending on the reception timing of the infrared light and ultrasonic wave.

19 Claims, 5 Drawing Sheets

FIG. 4

|  | Outer shape | | Switch operation | |
|---|---|---|---|---|
|  | Side part | Tail end | Switch 7 | Switch 8 |
| Black marker 6a | Recess | Recess | OFF | OFF |
| Red marker 6b | Recess | Recess | OFF | ON |
| Blue marker 6c | Protrusion | Recess | ON | OFF |
| Green marker 6d | Protrusion | Protrusion | ON | ON |

ELECTRONIC WHITEBOARD AND PENHOLDER USED FOR THE SAME

FIELD OF THE INVENTION

The present invention relates to an electronic whiteboard and a penholder used for the same, and more particularly to marker-color-changing in a penholder fitting or incorporating a marker pen, in an electronic whiteboard for storing the information drawn on a board by using a marker pen into a personal computer (hereinafter called computer) by using a sound wave. Herein, the electronic whiteboard makes use of acoustic-coordinates-input-technology (hereinafter called digitizing technology) of plane input type.

BACKGROUND OF THE INVENTION

Recently, the digitizer is widely used for picking up coordinates by pointing the design drawing adhered on a board by using a pen dedicated for the digitizer, and putting the design drawing into the computer.

This pen has a dedicated function of emitting an ultrasonic wave and infrared light, and sends the ultrasonic wave and infrared light to sensors disposed at both ends in the width direction of the upper end of the board. The pointing position on the board is transmitted from the sensors to the computer and is stored as data.

This technology is also applied in the so-called electronic whiteboard.

FIG. 5 is a schematic structural diagram of an electronic whiteboard making use of the conventional digitizing technology.

In the electronic whiteboard shown in FIG. 5, four penholders 102a, 102b, 102c, 102d hold black, red, blue and green marker pens for whiteboard, and have function of emitting infrared light and an ultrasonic wave. The penholders 102a, 102b, 102c, 102d transmit infrared light and the ultrasonic wave to sensors 103a and 103b disposed at both ends in the width direction of the upper end of a board 101.

The sensors 103a, 103b receive the infrared light and ultrasonic wave. Depending on the time difference of receiving the infrared light and ultrasonic wave in the sensors 103a, 103b, the distance from the penholder 102a to the sensors 103a, 103b is calculated. The obtained data is transferred to a computer 104. The computer 104 calculates the position of the penholder 102a on the board 101 by trigonometry, and shows the position information of the penholder 102a on a display unit.

In the electronic whiteboard of such structure, the position information of the penholder 102a and others is instantly shown on the computer display, and the drawing information on the board 101 is stored in the computer.

In the electronic whiteboard shown in FIG. 5, when using black, red, blue, and green colors, to change the colors to be drawn on the board 101, four penholders 102a to 102d corresponding to the colors are needed. That is, the penholders are required as many as the number of colors. Since the penholders have the costly function of emitting infrared light and an ultrasonic wave, it leads to increase of cost.

Further, if the user mounts a marker pen of a wrong color, drawing information of a different color is stored in the computer. Or if one penholder is broken, the specific color cannot be used.

SUMMARY OF THE INVENTION

The electronic whiteboard of the invention includes a penholder for mounting marker pens, and an electronic whiteboard main body.

An infrared light emitting unit of the penholder emits infrared light containing the color information of marker pen, an ultrasonic wave emitting unit emits an ultrasonic wave, and color changeover means changes over the color information depending on the color of marker pen.

The electronic whiteboard main body receives the infrared light and ultrasonic wave emitted from the penholder, and determines the position of the penholder depending on the reception timing of the infrared light and ultrasonic wave.

The electronic whiteboard main body includes plural sensors. The plural sensors receive the infrared light and ultrasonic wave. Depending on the time difference of the reception timing of the ultrasonic wave in the plural sensors, the electronic whiteboard main body issues the information about the position of the penholder.

By this invention, the number of penholders is decreased by changing over the color information of the infrared light to be emitted according to the color of the marker pen being used.

At the same time, error by the user mounting a wrong marker pen is prevented.

BRIEF DESCRIPTION OF THE DRAWINGS

FIG. 4 explains relations between external shapes of color marker pens and operation of detection switches used in the electronic whiteboard according to embodiment 2 of the invention.

DESCRIPTION OF THE PREFERRED EMBODIMENTS

The electronic whiteboard is also known as electronic blackboard, electronic presentation board, or electronic copy board. In a well-known electronic whiteboard, for example, letters or patterns are drawn on a whiteboard by using a marker pen for whiteboard, and their copies are discharged as hard copies.

The invention relates to an electronic whiteboard for detecting the position of a marker pen on the electronic whiteboard by making use of the infrared light and ultrasonic wave, and issuing the data about its position, and a penholder of the marker pen.

Whether called electronic whiteboard, electronic blackboard, electronic presentation board, or electronic copy board, the invention is applied to any board on which letters can be written and pictures can be drawn, and a penholder used for the same.

Preferred embodiments of the invention are described below.

(Embodiment 1)

Figure 1:
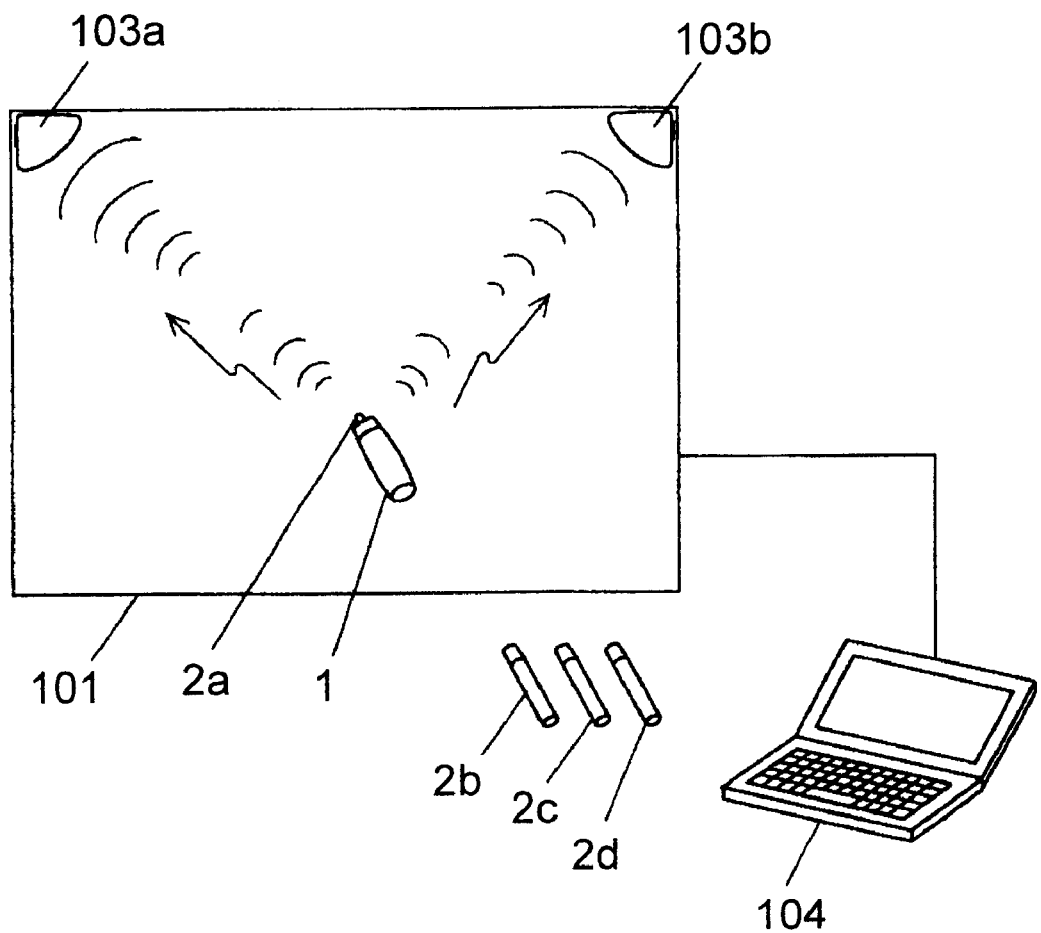
FIG. 1 is a schematic structural diagram of an electronic whiteboard having a penholder according to embodiment 1 of the invention.

FIG. 1 is a schematic structural diagram of an electronic whiteboard having a penholder in embodiment 1 of the invention.

In FIG. 1, a penholder 1 holds, for example, a black marker pen 2a for whiteboard, and emits infrared light and an ultrasonic wave. The penholder 1 transmits the infrared light and an ultrasonic wave to sensors 103 disposed at both ends in the width direction of the upper end of the board 101. Further, red, blue and green marker pens 2b, 2c, 2d for whiteboard are used.

The sensors 103a, 103b receive the infrared light and ultrasonic wave emitted from the penholder 1. Further, on the basis of the time difference of reception timing of the infrared light and ultrasonic wave, the sensors 103a and 103b calculate the distance from the penholder 1 to the sensors 103a and 103b, and transfer the data to a computer 104.

This time difference is substantially the time for the ultrasonic wave to reach from the penholder 1 to the sensors 103a, 103b.

The computer 104 calculates the position of the penholder 1 on the board 101 by trigonometry, and shows the position information of the penholder 1 on the display.

In the electronic whiteboard of such a structure, the position information of the penholder 1 is instantly shown on the computer display, and the drawing information on the board 101 can be taken into the computer.

Or, the sensors 103a, 103b may transmit signals showing reception of the infrared light and ultrasonic wave to the computer. The computer may calculate the position of the penholder 1 based on the time difference. Further, the electronic whiteboard itself may have a function of calculating the position information of the penholder.

The penholder is explained below.

Figure 2:
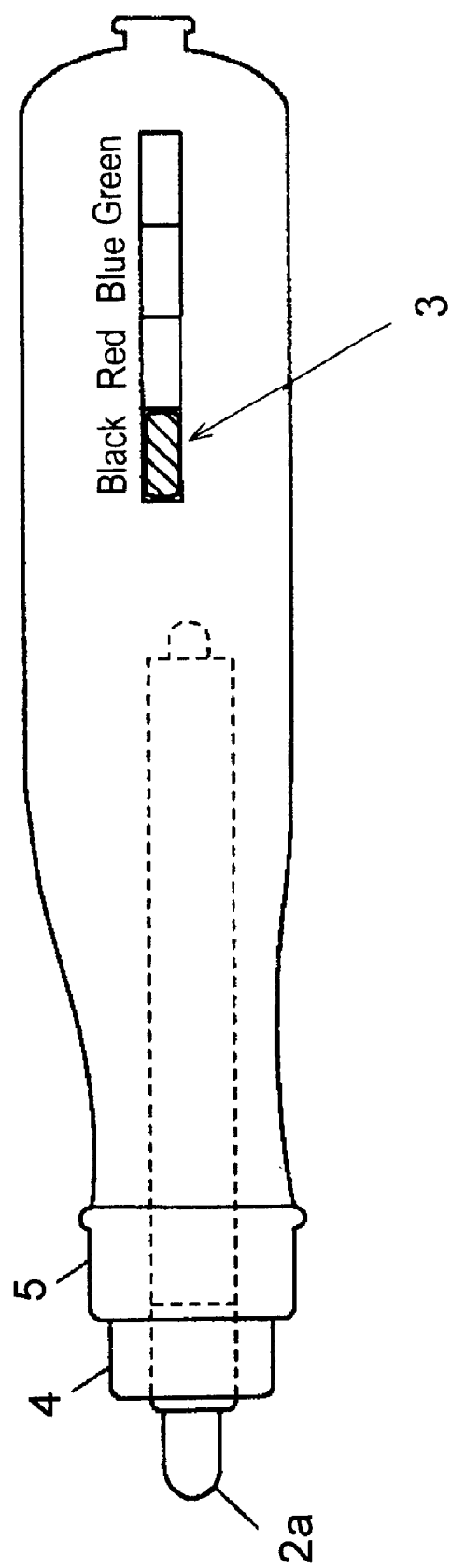
FIG. 2 is a schematic structural diagram of the penholder used in the electronic whiteboard according to embodiment 1 of the invention.

FIG. 2 is a schematic structural diagram of the penholder used in the electronic whiteboard in embodiment 1 of the invention.

In FIG. 2, the penholder includes a black marker pen 2a, a color changeover switch 3 for changing over colors according to the color of the marker pen being installed, an ultrasonic wave emitting unit 4, and an infrared light emitting unit 5 for emitting infrared light containing color information.

In the color changeover switch 3, by pressing a key corresponding to black, red, blue or green, the color information is changed over to black, red, blue or green, respectively.

In this constitution, when drawn in black, the black marker pen 2a is mounted on the penholder 1, and the color changeover switch 3 is changed to black. At this time, the penholder 1 emits the ultrasonic wave and infrared light containing black color information. Therefore, the computer 104 takes in the black drawing information.

Next, for example, when drawn in red, the black marker pen 2a is removed, and the red marker pen 2b is mounted on the penholder 1, and the color changeover switch 3 is changed to red. At this time, the penholder 1 emits the ultrasonic wave and infrared light containing red color information. Therefore, the computer 104 takes in the red drawing information.

Thus, according to the constitution of embodiment 1 of the invention, the number of penholders is decreased, and the cost can be lowered.

(Embodiment 2)

Figure 3:
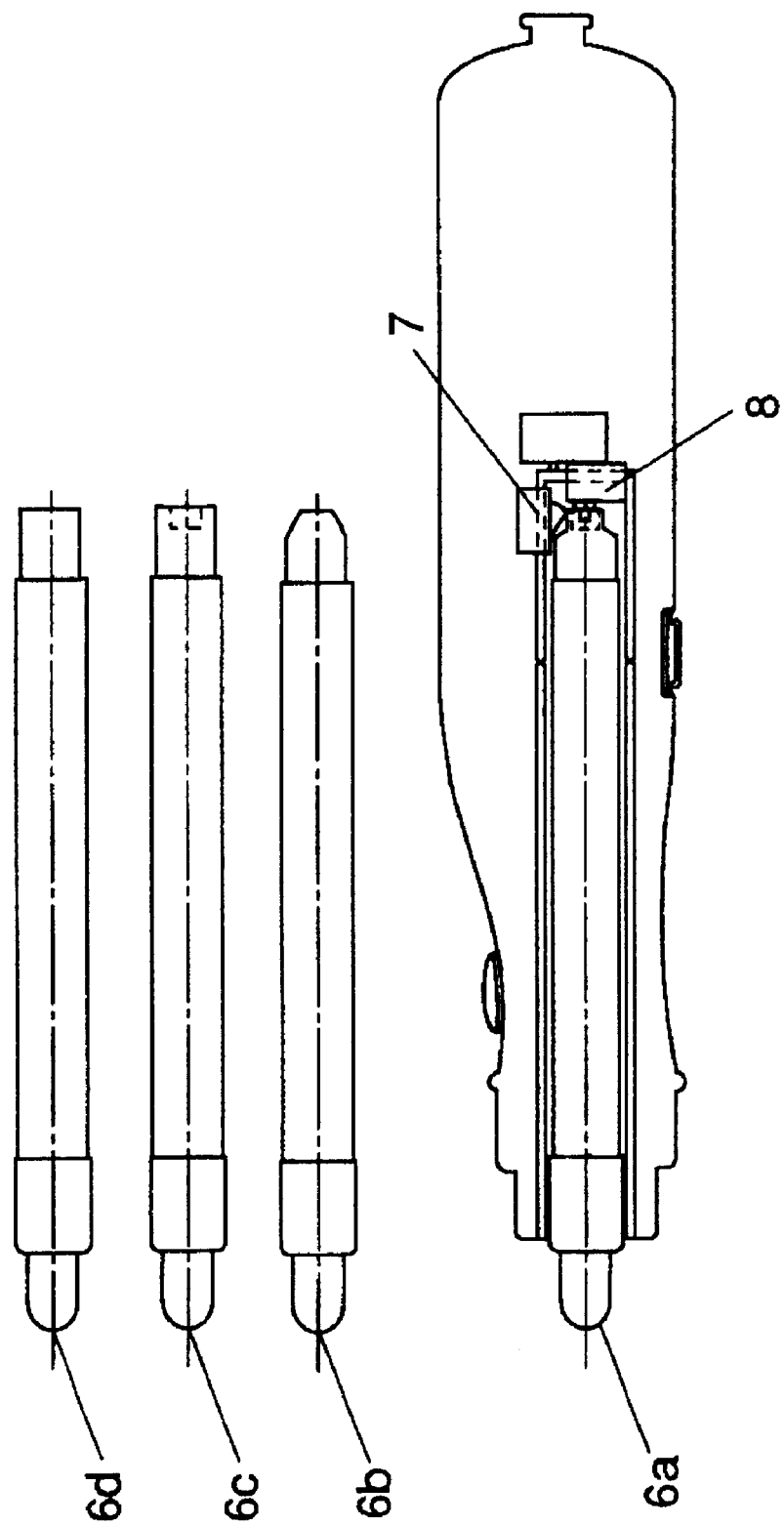
FIG. 3 is a schematic diagram of a marker pen and a sectional view of a penholder used in an electronic whiteboard according to embodiment 2 of the invention.
Figure 5:
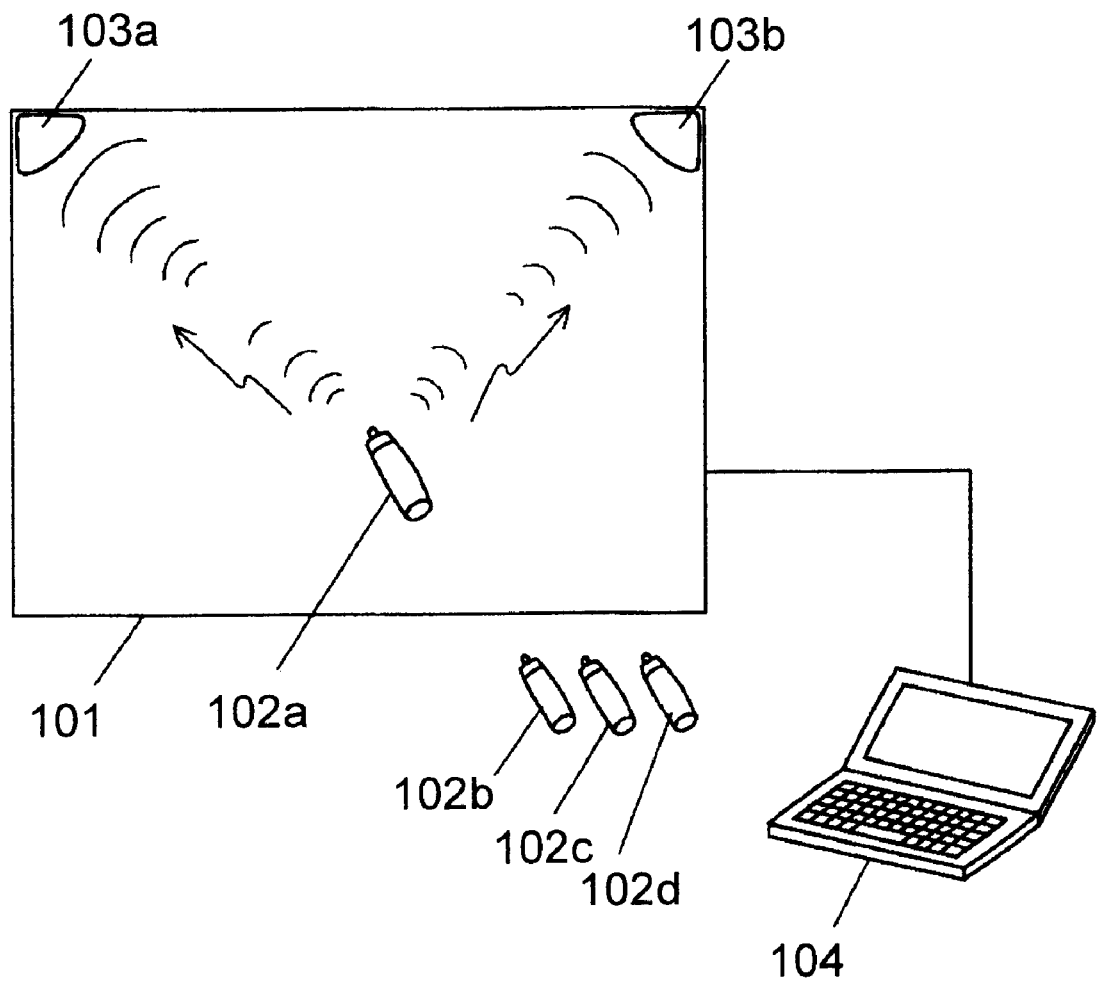
FIG. 5 is a schematic structural diagram of an electronic whiteboard making use of a conventional digitizing technology.

FIG. 3 is a schematic diagram of a marker pen and a sectional view of a penholder used in an electronic whiteboard in embodiment 2 of the invention.

The structure and operation of the electronic whiteboard in embodiment 2 of the invention are the same as shown in FIG. 1, and the same explanation is omitted.

In FIG. 3, black, red, blue, and green marker pens 6a, 6b, 6c, 6d have a protrusion or a recess at two portions, that is, in the side part and tail end of the outer shape of the marker pen. The penholder has detection switches 7, 8 disposed at positions corresponding to the protrusion or recess when the marker pen is installed.

FIG. 4 explains relations between external shapes of color marker pens and operation of detection switches in embodiment 2 of the invention.

For example, in the case of the black marker pen 6a, since both the side part and tail end of the outer shape forms recesses. Therefore, when installed in the penholder, the detection switches 7 and 8 are not pressed and are hence turned off.

In the case of the blue marker pen 6c, the side part of the outer shape forms a protrusion and the tail end forms a recess. Therefore, when installed in the penholder, the detection switch 7 is turned on and the detection switch 8 is turned off.

Thus, when the marker pen is installed in the penholder, the color of the marker pen is recognized automatically.

Therefore, when mounting the blue marker pen and drawing, the penholder emits the ultrasonic wave and infrared light containing blue color information. At this time, the computer takes in the blue drawing information.

In this manner, according to the constitution of embodiment 2 of the invention, the number of penholders is curtailed, and the cost can be lowered. Moreover, since the color of the marker pen can be recognized automatically, error due to wrong mounting by the user is prevented.

As described herein, according to the invention, only by changing over the color information of infrared light according to the color of the marker pen being used, the number of penholders is decreased, and the cost can be lowered.

At the same time, error due to wrong mounting by the user is prevented.

Of course, when two penholders are prepared, if one is broken, the other can be used in all colors.

While in the above embodiments color of the marker pen is indicated by the infrared light, it is understood that in alternative embodiments, color is indicated alternatively or in addition by the ultrasonic wave from the ultrasonic wave emitting unit.

What is claimed is:

1. An electronic whiteboard comprising:
   a-1) an infrared light emitting unit for emitting infrared light,
   a-2) an ultrasonic wave emitting unit for emitting an ultrasonic wave,
   one of said infrared light and said ultrasonic wave indicates a color of the marker pen,
   a-3) color changeover means for changing the color of the marker pen which is indicated by the one of the infrared light and the ultrasonic wave, wherein said color changeover means includes i) at least one of a protrusion and a recess provided in the marker pen based on a color thereof, and ii) a switch for detecting at least one of the protrusion and the recess, and
   b) an electronic whiteboard main body for receiving one of the infrared light and the ultrasonic wave emitted from the penholder to obtain color information, which corresponds to the color of the marker pen and for obtaining information about a position of the penholder based on timing of receipt of the infrared light and the ultrasonic wave.

2. The electronic whiteboard of claim 1, wherein said electronic whiteboard main body includes plural sensors, said plural sensors receive the infrared light and the ultrasonic wave, and the electronic whiteboard main body obtains the information about the position of the penholder based on time difference of the reception timing of the ultrasonic wave by the plural sensors.

3. The electronic whiteboard of claim 2, wherein the information about the position of the penholder includes a distance from the penholder to each one of the plural sensors.

4. The electronic whiteboard of claim 1, wherein said color changeover means includes a switch for changing color of the marker pen which is indicated by the infrared light emitting unit.

5. The electronic whiteboard of claim 2, wherein said color changeover means includes a switch for changing color of the marker pen which is indicated by the infrared light emitting unit.

6. A penholder for holding a marker pen for use with an electronic whiteboard, said penholder comprising:

a) an infrared light emitting unit for emitting infrared light, b) an ultrasonic wave emitting unit for emitting an ultrasonic wave, and one of the infrared light and the ultrasonic wave indicates a color of the marker pen, c) color changeover means for changing the color of the marker pen which is indicated by the one of the infrared light and the ultrasonic wave, wherein said color changeover means includes a switch for detecting at least one of a protrusion and a recess provided in the marker pen bard on a color thereof.

7. The penholder of claim 6, wherein said color changeover means includes a switch for changing color of the marker pen which is indicated by the infrared light emitting unit.

8. The penholder of claim 6, wherein said electronic whiteboard receives one of the infrared light and the ultrasonic wave emitted from the penholder to obtain color information which corresponds to the color of the marker pen, and determines a position of the penholder based on timing of receipt of the infrared light and the ultrasonic wave.

9. An electronic whiteboard comprising:

a-1) an infrared light emitting unit for emitting infrared light, a-2) an ultrasonic wave emitting unit for emitting an ultrasonic wave, one of said infrared light and said ultrasonic wave indicates a color of the marker pen, a-3) color changeover means for changing the color of the marker pen which is indicated by the one of the infrared light and the ultrasonic wave, said color changeover means providing a visual indication of the color of the marker pen, and b) an electronic whiteboard main body for receiving the one of the infrared light and the ultrasonic wave emitted from the penholder to obtain color information which corresponds to the color of the marker pen, and for obtaining information about a position of the penholder based on timing of receipt of the infrared light and the ultrasonic wave.

10. The electronic whiteboard of claim 9, wherein said electronic whiteboard main body includes plural sensors, said plural sensors receive the infrared light and the ultrasonic wave, and the electronic whiteboard main body obtains the information about the position of the penholder base on time difference of the reception timing of the ultrasonic wave by the plural sensors.

11. The electronic whiteboard of claim 10, wherein the information about the position of the penholder includes a distance from the pen holder to each one of the plural sensors.

12. The electronic whiteboard of claim 9, wherein said color changeover means includes a switch for changing color of the marker pen which is indicated by the infrared light emitting unit.

13. The electronic whiteboard of claim 10, wherein said color changeover means includes a switch for changing color of the marker pen which is indicated by the infrared light emitting unit.

14. The electronic whiteboard of claim 9, wherein said color changeover means includes
   i) at least one of a protrusion and a recess provided in the marker pen based on a color thereof, and
   ii) a switch for detecting at least one of the protrusion and the recess.

15. The electronic whiteboard of claim 10, wherein said color changeover means includes
   i) at least one of a protrusion and a recess provided in the marker pen based on a color thereof, and
   ii) a switch for detecting at least one of the protrusion and the recess.

16. A penholder for holding a marker pen for use with an electronic whiteboard, said penholder comprising:

a) an infrared light emitting unit for emitting infrared light, b) an ultrasonic wave emitting unit for emitting an ultrasonic wave, and one of the infrared light and the ultrasonic wave indicates a color of the marker pen, c) color changeover means for changing the color of the marker pen which is indicated by the one of the infrared light and the ultrasonic wave, said color changeover means providing a visual indication of the color marker pen.

17. The penholder of claim 16, wherein said color changeover means includes a switch for changing color of the marker pen which is indicated by the infrared light emitting unit.

18. The penholder of claim 16, wherein said color changeover means includes a switch for detecting at least one of a protrusion and a recess provided in the marker pen based on a color thereof.

19. The penholder of claim 16, wherein said electronic whiteboard receives one of the infrared light and the ultrasonic wave emitted from the penholder to obtain color information which corresponds to the color of the marker pen, and determines a position of the penholder based on timing of receipt of the infrared light and the ultrasonic wave.

* * * * *